United States Patent
Bohringer et al.

(10) Patent No.: US 7,572,322 B2
(45) Date of Patent: Aug. 11, 2009

(54) PLASMA-TREATED TEXTILE SURFACES FOR ADSORPTION FILTER MATERIALS

(75) Inventors: Bertram Bohringer, Wuppertal (DE); Thomas Stoll, Metzingen (DE); Peter Heinrich, Moers (DE); Michael Moskopp, Schwalmtal (DE)

(73) Assignee: Blucher GmbH, Erkrath (DE)

( * ) Notice: Subject to any disclaimer, the term of this patent is extended or adjusted under 35 U.S.C. 154(b) by 461 days.

(21) Appl. No.: 10/581,329

(22) PCT Filed: Sep. 9, 2004

(86) PCT No.: PCT/EP2004/010036

§ 371 (c)(1),
(2), (4) Date: Aug. 30, 2006

(87) PCT Pub. No.: WO2005/053838

PCT Pub. Date: Jun. 16, 2005

(65) Prior Publication Data

US 2007/0134483 A1 Jun. 14, 2007

(30) Foreign Application Priority Data

Dec. 2, 2003 (DE) .................. 103 56 776

(51) Int. Cl.
*B01J 20/28* (2006.01)
*A62B 17/00* (2006.01)
(52) U.S. Cl. ............... 96/134; 96/135; 96/154; 442/122; 2/457
(58) Field of Classification Search ............ 96/134, 96/135, 153, 154, 4; 95/90, 131, 132, 142; 442/121, 122, 179, 255; 2/457
See application file for complete search history.

(56) References Cited

U.S. PATENT DOCUMENTS 4,217,386 A * 8/1980 Arons et al. ............ 428/198

(Continued)

FOREIGN PATENT DOCUMENTS

DE 196 40 607 A1 4/1998

(Continued)

OTHER PUBLICATIONS

McCullough et al. "A comparison of standard methods for measuring water vapour permeability of fabrics" in *Meas. Sci. Technology* [Measurements Science and Technology] 14, 1402-1408, Aug. 2003, pp. 1402-1408.

(Continued)

*Primary Examiner*—Frank M Lawrence
(74) *Attorney, Agent, or Firm*—Woodard, Emhardt, Moriarty, McNett & Henry LLP

(57) ABSTRACT

The invention relates to an adsorption filter material (1) that provides protection against chemical toxins, chemical weapons and pollutants, with a preferably multi-layer composite construction (2). The layer construction (2) includes at least one planar support layer (3) with two opposing sides (3', 3") and an adsorption layer (4), provided on the support layer (3) made from a material which adsorbs chemical toxins, the surface of at least one of the both sides (3' and/or 3") of the support layer (3) being modified by plasma treatment. The surface properties, in particular the surface finish and the surface reactivity can be adjusted and optimised to match the application by means of the plasma treatment.

5 Claims, 1 Drawing Sheet

U.S. PATENT DOCUMENTS

| | | | |
|---|---|---|---|
| 4,510,193 A * | 4/1985 | Blucher et al. | 428/196 |
| 5,024,594 A * | 6/1991 | Athayde et al. | 442/67 |
| 5,328,576 A * | 7/1994 | Paskalov et al. | 204/164 |
| 6,187,391 B1 * | 2/2001 | Kataoka et al. | 427/569 |
| 7,132,007 B1 * | 11/2006 | von Blucher et al. | 95/90 |
| 7,160,369 B2 * | 1/2007 | von Blucher et al. | 96/132 |
| 2002/0110687 A1 * | 8/2002 | Winchester | 428/370 |
| 2003/0089237 A1 * | 5/2003 | Jagtoyen et al. | 96/108 |
| 2007/0240576 A1 * | 10/2007 | von Blucher et al. | 96/154 |

FOREIGN PATENT DOCUMENTS

| | | |
|---|---|---|
| DE | 100 37 048 A1 | 2/2002 |
| DE | 102 61 996 A1 | 3/2004 |
| WO | WO 03/045461 A1 | 6/2003 |

OTHER PUBLICATIONS

Din En 31 092: 1993 of Feb. 1994 ("Textiles—Physiological Effects, Measurement of Heat and Water Vapor Transmission Resistance under steady state Conditions [sweating guarded-hotplate test]", 9 pgs.

* cited by examiner

PLASMA-TREATED TEXTILE SURFACES FOR ADSORPTION FILTER MATERIALS

CROSS-REFERENCES TO RELATED APPLICATIONS

This application is a National Stage filing of International Application PCT/EP2004/010036, filed Sep. 9, 2004, claiming priority to German Application No. DE 103 56 776.3, filed Dec. 2, 2003, entitled "PLASMA-TREATED SURFACES FOR ADSORPTION FILTER MATERIALS". The subject application claims priority to PCT/EP2004/010036 and to German Application No DE 103 56 776.3 and both references are expressly incorporated by reference herein, in their entirety.

BACKGROUND OF THE INVENTION

The present invention relates to plasma-treated textile surfaces for use in adsorptive filtering materials.

More particularly, the present invention relates to an adsorptive filtering material having protective function against chemical poisons, in particular chemical warfare agents and chemical noxiants, as classified and disclosed herein, in particular for the production of protective materials, such as protective suits, protective gloves, protective shoes, protective covers (for example to transport casualties) and the like, in particular for NBC deployment, and also to the aforementioned protective materials produced using this adsorptive filtering material.

There are a whole series of entities which are absorbed by the skin and lead to serious physical harm. Examples include the blister agent Hd (yellow cross) and the nerve gas sarin. People liable to come into contact with such poisons have to wear a suitable protective suit or be protected against these poisons by suitable protective materials.

There are in principle three types of protective suits: the air- and water-vapor-impervious protective suits which are equipped with a layer of rubber impervious to chemical poisons and which very rapidly lead to a build-up of heat; the air- and water-vapor-pervious protective suits which offer the highest wear comfort; and finally protective suits which are equipped with a membrane which allows water vapor but not the aforementioned poisons through. NBC protective clothing is thus traditionally produced either from completely impermeable systems (for example suits composed of butyl rubber) or permeable, adsorptive filtering systems based on activated carbon (in pulverulent, fibrous or spherulous form).

Protective suits against chemical warfare agents that are intended for prolonged use under a wide variety of conditions must not lead to a build-up of heat for the wearer. Air-pervious materials are therefore used in the main. The air-pervious, permeable protective suits generally possess an adsorbing layer comprising activated carbon which binds the chemical poisons very durably, so that even badly contaminated suits do not pose any danger to the wearer. The great advantage of this system is that the activated carbon is accessible on the inside as well as the outside, so that poisons which have succeeded in penetrating at damaged or otherwise unproof locations are very rapidly adsorbed. However, under extreme conditions, for example when a drop of a thickened poison impinges from a considerable height onto a somewhat open location on the outer material and is able to strike through to the activated carbon, the carbon layer may locally not be up to its task for a brief period.

The present invention therefore has for its object to provide an adsorptive filtering or protective material which at least substantially avoids the prior art disadvantages described above and which is especially useful for the production of NBC protective materials, such as protective suits, protective gloves, protective shoes, protective covers and the like.

This object is achieved in the realm of the present invention by an adsorptive filtering material as disclosed and claimed herein. Further, advantageous refinements of the adsorptive filtering material according to the preferred embodiment of the present invention are disclosed and claimed herein.

The present invention further provides for the use of the present invention's adsorptive filtering material for producing protective materials of any kind, in particular for producing protective suits, protective gloves, protective shoes and protective covers, preferably for NBC deployment, and also the thus produced protective materials of the aforementioned kind themselves.

According to a first aspect of the present invention there is accordingly provided an adsorptive filtering material which provides protection against chemical poisons, in particular chemical warfare agents and chemical noxiants, and has a preferably plural layered construction, the layered construction comprising at least one, in particular sheetlike (i.e. flat-shaped), supporting layer having two opposite sides and an adsorbing layer associated to the supporting layer and based on a material capable of adsorbing chemical poisons, wherein the surface of at least one of the two sides of the supporting layer is modified by plasma treatment.

This is because Applicant has found that, surprisingly, the properties, in particular the protective or adsorptive performance, of adsorptive filtering materials can be decisively influenced and improved when the supporting layer, which is customarily present in adsorptive filtering materials of this kind, is modified at its surfaces by means of plasma treatment. Plasma treatment provides a way of specifically adjusting the surface properties, such as surface constitution (for example roughness) and surface reactivities (for example hydrophilicity or hydrophobicity on the one hand or oleophilicity or oleophobicity on the other).

The fundamental idea of the present invention is thus to endow adsorptive filtering materials having a preferably plural layered construction with an enhanced protective function against chemical poisons, in particular chemical warfare agents and chemical noxiants, by the surface properties of the supporting materials, or supporting layers, customarily present in adsorptive filtering materials of this kind being modified by plasma treatment and thereby being appropriately adapted or optimized to the particular application requirements.

Further advantages, properties, aspects and features of the present invention will be apparent from the following description of preferred operative examples and as depicted in the drawings.

BRIEF SUMMARY OF THE INVENTION

An adsorptive filtering material for providing protection against chemical poisons, in particular chemical warfare agents and chemical noxiants, according to one embodiment of the present invention, preferably includes a plural layered construction, comprising at least one supporting layer having two opposite sides and an adsorbing layer associated to the supporting layer and based on a material capable of adsorbing chemical poisons, wherein the surface of at least one of the two sides of the supporting layer is modified by plasma treatment.

One object of the present invention is to provide an improved adsorption filter material.

Related objects and advantages of the present invention will be apparent from the following description.

DETAILED DESCRIPTION OF THE INVENTION

Figure 1A:
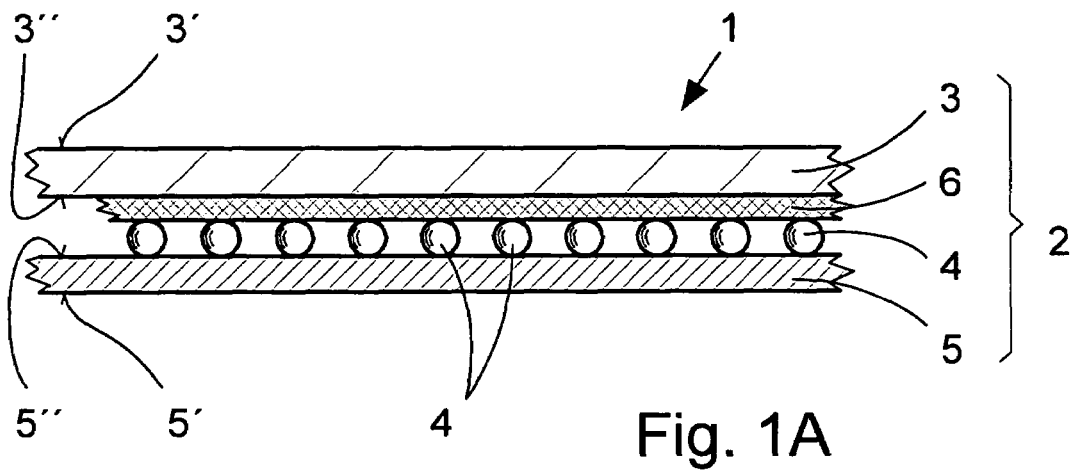
FIG. 1A shows a schematic section through the layered construction of an adsorptive filtering material according to a preferred operative example of the present invention where the adsorbing layer is formed by discrete fragments of adsorbent.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1B:
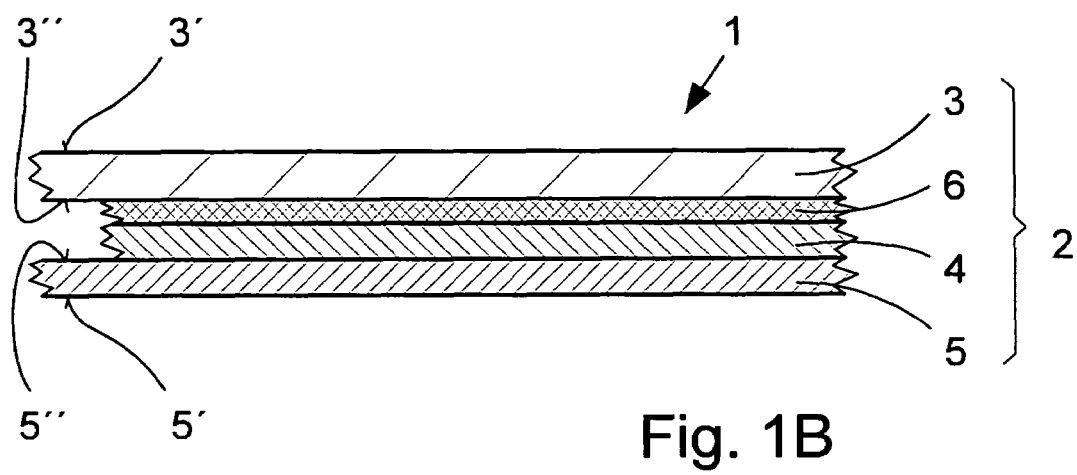
FIG. 1B is a schematic section through the layered construction of an adsorptive filtering material according to a further preferred operative example of the present invention as per an alternative embodiment where the adsorbing layer is configured as a continuous layer of an activated carbon fiber sheetlike fabric.

FIGS. 1A and 1B each show a schematic section through the layered construction 2 of a present invention adsorptive filtering material 1. The present invention's adsorptive filtering material 1, which is equipped with a protective function against chemical poisons, in particular chemical warfare agents and chemical noxiants, preferably comprises a plural layered construction 2 comprising at least one, in particular sheetlike, supporting layer 3 having two opposite sides 3', 3" and also an adsorbing layer 4 associated to the supporting layer 3 and based on a material capable of adsorbing chemical poisons. The surface of at least one of the two sides 3', 3" of the supporting layer 3 is modified by plasma treatment; the surface properties of the supporting layer or material 3 are thereby specifically modifiable or adjustable.

As is evident from FIGS. 1A and 1B, the present invention's adsorptive filtering material 1 may further comprise at least one further, in particular sheetlike, supporting layer 5 having two opposite sides 5', 5". In general, the second supporting layer 5 is disposed on that side of adsorbing layer 4 which is opposite the first supporting layer 3. The surface of at least one of the two sides 5', 5" of the second supporting layer 5 may similarly be modified by plasma treatment.

As used herein, the term "plasma treatment" comprises every conventional method for plasma-treating supporting layers or supporting materials, in particular textile supporting layers or supporting materials, which is suitable in the realm of the present invention.

Plasma is often referred to as the fourth state of matter. When a solid material is supplied with energy, it may become a liquid and, if still further energy is supplied in that state, the liquid can become a gas. When, finally, yet additional energy of the right kind is introduced, the gas can dissociate and turn into a plasma. Plasmas exist in a multiplicity of phenomena. Plasmas of very high energy and temperature are not employable in industry, in particular not for the treatment of surfaces of supporting layers. The plasma treatment contemplated by the present invention therefore utilizes in particular low pressure or vacuum processes, so that the temperature of the plasma is only minimally above the ambient temperature (so-called low temperature or cold gas plasma). This is accomplished in particular by employing a suitable energy variety and selection of a suitable gas atmosphere, and this is within the realm of the expertise of any person skilled in the art.

Without wishing to be bound by a specific theory, it is believed that a plasma treatment is accompanied by various mutually competing molecular processes or reactions capable of modifying the surface or surfaces of the supporting layer or material 3 and/or of the supporting layer or material 5, namely first by ablation (=removal of surface material by vaporization, occasionally also referred to by the synonyms of etching or plasma etching), secondly by crosslinking (=chemical bonding together of two or more polymeric chains) and thirdly by activation (=replacement of atoms in the surface by chemical groups from the plasma). These three aforementioned reactions are influenced and controlled by the gas chemistry and the operating variables (pressure, temperature, energy input, treatment time, etc.) in any one plasma-treating system.

The plasma which is preferably used according to the present invention is a low temperature plasma, in particular a cold gas plasma, in particular with temperatures below 60° C., preferably below 50° C., in order that the surface to be modified is not damaged or destroyed. To achieve such low temperatures, it is customary to operate at reduced pressure or in vacuo, in particular at pressures from 0.0001 to 100 Torr and preferably from 0.001 to 10 Torr. Useful plasma-forming gases include inorganic and/or organic gases or gas mixtures, for example based on nitrogen oxides, carbon oxides, noble gases, nitrogen, oxygen, ozone and/or chlorous gases. This will be known per se to one skilled in the art.

To plasma-treat the surface or surfaces to be modified, the surface or surfaces are exposed to the plasma for a sufficient period to obtain the desired surficial properties. This may be done for example by introducing the supporting layer or layers 3 and/or 5 into an appropriate plasma vacuum chamber and then allowing the plasma to act for a sufficient period on the corresponding surface or surfaces to be modified. By selecting suitable operating parameters (pressure, temperature, energy input, treatment time, selection of gases, etc.), which will be familiar per se to one skilled in the art, the surface can then be modified in the desired manner.

To generate the plasma, the plasma-forming gases are generally exposed to a high frequency energy (for example in the range from 40 kHz to 3 GHz) to dissociate the plasma-forming gases into a plasma which subsequently acts on the surface to be modified. The pressure conditions, treatment time, temperature, gas selection and energy frequencies are all interrelated variables which one skilled in the art is able on the basis of his or her expertise as a person skilled in the art to specifically adjust or select with regard to the modification to be carried out.

In general, the plasma treatment is carried out directly at the surface or surfaces 3', 3", 5', 5" of the supporting layers 3 and 5 respectively. But it is similarly possible for the plasma treatment to be carried out only indirectly at the surface or surfaces 3', 3", 5', 5" of the supporting layers 3 and 5 respectively by initially applying a polymeric or polymerizable film to the surface or surfaces to be treated and then crosslinking or curing the polymeric or polymerizable film by plasma treatment; polymeric or polymerizable films useful for the present invention include for example films of silicones, in particular silicone oils, or organopolysiloxanes.

The plasma treatment makes it possible to specifically adjust the surface properties of the supporting layers 3 and 5, for example the surface constitution (for example roughness) or surface reactivities. For example, by increasing the roughness it is possible to specifically increase the bonding power of adhesives to secure the adsorbing layer 4 to the supporting layer 3 or 5. By increasing or reducing surface reactivity, it is possible for example to specifically achieve hydrophilic/hydrophobic or oleophilic/oleophobic properties for the surfaces, for example in order to obtain repellency with regard to chemical poisons, for example organic chemicals, or better or worse water-wettability. For example, an increased surficial reactivity can be experimentally characterized in terms of water wettability, i.e., the ability of a liquid, in particular water, to spread out over and penetrate into a surface. Water wettability can be measured in terms of the contact angle between the liquid, in particular water, and the surface by using reference liquids having known properties; the relationship between contact angle and surface energy/surface reactivity is direct, i.e., the contact angle decreases with the surface energy/reactivity.

When the present invention's adsorptive filtering material 1 is used for example in NBC protective materials, for example in NBC protective suits, the plasma treatment can be used to modify the surface reactivity of the surface of at least one of the two sides 3', 3" of the supporting layer 3 on the one hand and of the surface of at least one of the two sides 5', 5" of the supporting layer 5 on the other to have contrary properties. The plasma treatment is used to enhance the surface reactivity of the surface of at least one of the two sides 3', 3" of the supporting layer 3 and reduce the surface reactivity of the surface of at least one of the two sides 5', 5" of the supporting layer 5, or vice versa. For example, the plasma treatment can be used to make the surfaces of the supporting layers 3 and 5 hydrophilic or hydrophobic or else oleophilic or oleophobic. Similarly, the plasma-treated surfaces of the supporting layer 3 or 5 can be made acidic or alkaline.

When the present invention's adsorptive filtering material 1 is used for example in NBC protective materials, in particular NBC protective suits, that side 3' of supporting layer 3 which, in the use state of the adsorptive filtering material 1, faces outward can be made oleophobic in order that organic chemicals may be rejected, whereas the surface of at least one of the two sides 5', 5"' of supporting layer 5, which faces the body side in the use state, can be made hydrophilic in order that perspiration may be better taken up and be more efficiently transported away from the body in the outward direction.

The supporting layers 3 and 5 may be preferably air-pervious textile materials. Examples thereof are textile sheetlike structures of any kind, examples being wovens, formed-loop knits, drawn-loop knits, nonwoven scrims, textile composites, batts and nonwovens.

The supporting layers 3 and 5 consist in general of preferably air-pervious textile materials which comprise or consist of polymeric/synthetic, preferably thermoplastic, fibers. This is necessary in order that the surfaces may be directly modified by plasma treatment. Examples of polymeric/synthetic textile fibers are polyacrylic (PAN), polyamides (PA), such as nylon 6 and nylon 66, polyesters (PES), polyolefins, in particular polyethylene (PE) and polypropylene (PP), polyvinyl alcohol (PVAl), polyvinyl chloride (CLF), polyvinylidene chloride (CLF), acetate (CA), triacetate (CTA), aramid (AR), elastane (EL), elastodiene (ED), fluoro (PTFE), rubber (LA), carbon (CF), viscose (CV) and also mixtures of the aforementioned fiber varieties. The parenthetical abbreviations are codes defined in German standard specification DIN 60001-4: 1991-08. The supporting layers 3 and 5 may consist of the aforementioned synthetic/polymeric fibrous materials or comprise these in a certain proportion (as for example in the case of blend materials composed of natural and synthetic/polymeric textile fibers). In the case of textile materials composed of purely natural textile fibers, plasma modification is made possible by prior application of a polymeric or polymerizable film, as described above.

In a particularly preferred embodiment of the present invention's adsorptive filtering material 1, at least one of the two supporting layers 3, 5 is a PA-PES textile sheetlike structure, in particular a PA-PES batt, or is a sheetlike structure including PES fibers and is in particular a PES-cellulose textile sheetlike structure.

In a preferred embodiment, the supporting layer 3 or 5, which in the use state of the adsorptive filtering material 1 faces a noxiant source, is preferably made oleophobic on its side 3' or 5' facing the noxiant source, by plasma treatment, in order that droplets of organic chemical substances may be more efficiently repelled, and the supporting layer 5 or 3, which in the use state of the adsorptive filtering material 1 faces away from a noxiant source, is preferably made hydrophilic on its side 5' or 3' facing away from the noxiant source, by plasma treatment, in order that moisture (for example perspiration) may be more efficiently transported away.

Plasma treatment thus makes it possible to specifically modify/change the surface properties of the supporting layers 3, 5. Thus, the surfaces may as described in detail above be rendered for example hydrophilic or hydrophobic, oleophilic or oleophobic, acidic or alkaline, rough or smooth, etc. It is possible in particular for the two sides of the textile composite of the present invention's adsorptive filtering material 1 to be subjected to different plasma treatments and different surficial properties to be achieved on both sides. For instance, one side can be rendered hydrophilic and the other hydrophobic.

The adsorbing layer 4 is generally configured as a separate layer. It is possible nonetheless to integrate the adsorbing layer 4 in the supporting layer 3 and/or 5, so that the adsorbing layer 4 is part of the supporting layer 3 and/or 5 (as for example in the case of a PU foam laden with activated carbon). In general, however, a separate adsorbing layer 4 is preferable.

As described above, the adsorbing layer 4 comprises a material capable of adsorbing chemical poisons, in particular chemical warfare agents and/or chemical noxiants. It is in particular an adsorptive filtering material based on activated carbon. Nonetheless, other adsorptive materials can be utilized, examples being molecular sieves, ion exchangers, zeolites, silica gels, etc. But activated carbon is particularly preferred for the purposes of the present invention. The adsorbing layer 4 may be secured to the supporting layer 3 and/or 5, in particular durably secured (for example by adhering, stapling, sewing, welding or the like), more preferably by adhering (for example with a thermoplastic adhesive, for example an, in particular, moisture-crosslinking polyurethane reactive adhesive), in which case the adhesive has advantageously been applied merely discontinuously and preferably dotwise to the supporting layer 3 and/or 5.

As FIG. 1A shows, the adsorbing layer 4 in one embodiment may be discontinuous. In this case, the adsorbing layer 4 will comprise discrete adsorptive fragments capable of adsorbing chemical poisons and based on activated carbon in particular, preferably in the form of activated carbon particles and/or activated carbon fibers. Advantageously, the adsorbing layer 4 preferably comprises the discrete particles of activated carbon preferably in granule form ("granulocarbon") or in spherical form ("spherulocarbon"), the average diameter of the activated carbon particles being less than 1.0 mm, in particular less than 0.5 mm, preferably less than 0.4 mm, but at least 0.1 mm. The activated carbon particles can be present in an amount of 5 to 500 g/m$^2$, in particular 10 to 400 g/m$^2$, preferably 20 to 300 g/m$^2$, more preferably 25 to 250 g/m$^2$. Advantageously, the internal surface areas (BET) of the activated carbon particles are at least 800 m$^2$/g, in particular at least 900 m$^2$/g, preferably at least 1,000 m$^2$/g and are preferably in the range from 800 to 1,500 m$^2$/g. To obtain a particularly good compressive strength, it is of advantage when the activated carbon particles have a burst pressure per individual activated carbon particle, in particular activated carbon granule or spherule, of at least 5 newton, in particular at least 10 newton, and the burst pressure can be up to 20 newton or more.

In an alternative embodiment, depicted in FIG. 1B, the adsorbing layer 4 may also comprise activated carbon fibers, in particular in the form of an activated carbon sheetlike structure. Suitable activated carbon sheetlike structures have a basis weight of 20 to 200 g/m$^2$, in particular 30 to 150 g/m$^2$ and preferably 50 to 120 g/m$^2$. The activated carbon sheetlike structure can be in particular a woven, loop-formingly knit, nonwoven-scrim or composited activated carbon fabric, in particular on the basis of carbonized and activated cellulose and/or on the basis of a carbonized and activated acrylonitrile.

To increase the adsorptive efficiency and performance, the adsorbent of the adsorbing layer 4, in particular the activated carbon particles and/or the activated carbon fibers, may additionally be impregnated with at least one catalyst. Catalysts useful in this invention include for example enzymes and/or metal ions, preferably ions of copper, of silver, of cadmium, of platinum, of palladium, of zinc and/or of mercury. The amount of catalyst can vary within wide limits; it is generally in the range from 0.05% to 12% by weight, preferably in the range from 1% to 10% by weight and more preferably in the range from 2% to 8% by weight, based on the weight of the adsorbing layer 4.

It is further possible for the adsorptive filtering material 1 according to the present invention also to be equipped with at least one membrane 6 which retards the passage of chemical poisons or is at least essentially impervious to chemical poisons. Advantageously, this membrane 6 can be at least essentially water and air impervious, but water vapor pervious.

The membrane 6 can be disposed between the first supporting layer 3 and the adsorbing layer 4 or else between the second supporting layer 5 and the adsorbing layer 4. Advantageously, the membrane 6 is disposed such that, in the use state of the present invention's adsorptive filtering material 1, it is disposed upstream of the adsorbing layer 4, so that the chemical poisons initially encounter the membrane 6.

The membrane 6 may in general be a continuous, in particular uninterrupted or at most microporous membrane.

The membrane 6 can be for example a membrane which is 1 to 500 μm thick, in particular 1 to 250 μm thick, preferably 1 to 100 μm and more preferably 1 to 50 μm thick, even more preferably 2.5 to 30 μm thick and most preferably 5 to 25 μm thick and comprises or consists of a plastic or a polymer. The plastic or polymer can be selected from the group of polyurethanes, polyetheramides, polyesteramides, polytetrafluoroethylenes and cellulose-based polymers and also derivatives of the aforementioned compounds. More preferably, the membrane 6 is a polyurethane-based membrane or an expanded, perhaps microporous membrane based on polytetrafluoroethylene.

In a particular embodiment, the membrane 6 is a multilayered membrane laminate or a multilayered membrane composite, and the membrane laminate or composite may consist of at least two and preferably at least three mutually interbonded layers or plies. For example, the membrane laminate or composite may comprise a core layer based on a cellulose-based polymer and two outer layers bonded to the core layer in particular on the basis of a polyurethane, of a polyetheramide and/or of a polyesteramide, in which case the core layer based on a cellulose-based polymer can be constructed as a membrane from 1 to 100 μm, in particular from 5 to 50 μm and preferably from 10 to 20 μm in thickness and the two outer layers bonded to the core layer may each be constructed as a membrane from 1 to 100 μm, in particular from 5 to 50 μm and preferably from 5 to 10 μm in thickness. The particular configuration of the membrane 6 as a membrane laminate or composite makes it possible to combine various membrane materials each having different properties, in particular different water vapor transmission rates and/or permeation resistances to chemical poisons, with one another and thus achieve an optimization of the properties of the membrane 6. For example, cellulose and cellulose derivatives are excellent barrier layer materials, in particular against chemical noxious or poisonous agents, examples being warfare agents (Hd etc.), and are not attacked or dissolved by these poisons; on the other hand, polyurethane-based materials inhibit any migration or diffusion of any plasticizers present in the cellulose layer and also muffle the rustling (due to the cellulose) which occurs in the course of use or wear. This is why it is preferable in this particular embodiment that in the case of a membrane laminate or composite where the core layer is formed on the basis of a cellulose-based polymer the two outer layers of the membrane 6 are formed by polyurethane layers.

The presence of the membrane 6, which in the use state of the present invention's adsorptive filtering material 1 is advantageously disposed upstream of the adsorbing layer 4, has the effect that any chemical poisons, such as for example chemical warfare agents or chemical noxiants, which have succeeded in penetrating through the supporting layer 3 or 5 are unable to penetrate further into the material, in particular are unable to reach the adsorbing layer 4 at all or at least overwhelmingly so, so that the adsorptive capacity of the adsorbing layer 4 remains quasi inexhaustible. On the other hand, when the adsorptive filtering material 1 is used as an NBC protective suit, the presence of the membrane 6 provides an additional protection for the wearer of the adsorptive filtering material 1 or of the NBC protective suit, so that the result is an adsorptive filtering material 1 having so to speak twice the protective function against chemical poisons (namely on the one hand due to the blocking effect of the membrane 6 and on the other due to the adsorptive effect of the adsorbing layer 4). By equipping the present invention's filtering material with a specific membrane 6 which retards the passage of chemical poisons or is at least essentially impervious to chemical poisons, good decontaminability and regenerability is achieved for the present invention's adsorptive filtering material 1 at the same time. This is because any poisons which have succeeded in penetrating the supporting layers 3 and 5 and are present on the membrane 6 are readily removable off the membrane 6 through appropriate treatment processes, for example by rinsing down, for example with suitable decontaminating solutions which will be very well known for these purposes to one skilled in the art.

Advantageously, the membrane 6 and thus the adsorptive filtering material 1 is constructed such that the membrane 6/the absorptive filtering material 1 has a barrier effect with regard to chemical warfare agents, in particular bis[2-chloroethyl]sulfide (mustard gas, Hd, yellow cross), measured according to CRDEC-SP-84010, method 2.2, permitting permeation of at most 4 µg/cm$^2$ per 24 h, in particular at most 3.5 µg/cm$^2$ per 24 h, preferably at most 3.0 µg/cm$^2$ per 24 h and more preferably at most 2.5 µg/cm$^2$ per 24 h when membrane 6 is 50 µm thick.

To increase the wear comfort, in particular the breathability, the membrane 6, when measured at 25° C. and at a thickness of 50 µm, has a high water vapor transmission rate of at least 12.5 l/m$^2$ per 24 h, in particular at least 17.5 l/m$^2$ per 24 h, preferably at least 20 l/m$^2$ per 24 h or more (measured by the inverted cup method of ASTM E 96 and at 25° C.). For further details concerning the measurement of the water vapor transmission rate [WVTR] cf. also McCullough et al. "A comparison of standard methods for measuring water vapour permeability of fabrics" in *Meas. Sci. Technology* [Measurements Science and Technology] 14, 1402-1408, August 2003. This ensures a particularly high wear comfort. Owing to the multiplicity of layers 3, 4, 5 and 6 of the layered construction 2, the water vapor transmission rate of the adsorptive filtering material 1 is as a whole—compared with membrane 6 alone—slightly lower; the water vapor transmission rate of the adsorptive filtering material 1 as a whole is nonetheless very high, amounting to at least 10 l/m$^2$ per 24 h, in particular at least 15 l/m$^2$ per 24 h and preferably at least 17.5 l/m$^2$ per 24 h when membrane 6 is 50 µm thick (at 25° C.).

For reasons of breathability, the membrane 6 should have a low water vapor transmission resistance $R_{et}$ under steady state conditions—measured according to DIN EN 31 092: 1993 of February 1994 ("Textiles—Physiological Effects, Measurement of Heat and Water Vapor Transmission Resistance under steady state Conditions [sweating guarded-hotplate test]" or according to the equivalent international standard ISO 11 092)—at 35° C. of at most 25 (m$^2$·pascal)/watt, in particular at most 20 (m$^2$·pascal)/watt, preferably at most 13 (m$^2$·pascal)/watt, when membrane 6 is 50 µm thick. Owing to the multiplicity of layers 3, 4, 5 and 6 of the layered construction 2, the water vapor transmission resistance $R_{et}$ of the adsorptive filtering material 1 as a whole—compared with membrane 6 alone—is slightly higher; in general, the water vapor transmission resistance $R_{et}$ of the adsorptive filtering material 1 as a whole is at most 30 (m$^2$·pascal)/watt, in particular at most 25 (m$^2$·pascal)/watt and preferably at most 20 (m$^2$·pascal)/watt when membrane 6 is 50 µm thick.

The membrane 6 should in addition be at most only minimally water absorptive/swellable; a minimal water absorptivity/swellability enhances the wear comfort. More particularly, the swellability/water absorbency of membrane 6 should be at most 35%, in particular at most 25% and preferably at most 20%, based on membrane 6's own weight. In addition, the membrane 6 should be at least essentially impervious to liquids, in particular water, and/or to aerosols, or at least retard their transmission. To achieve an at most minimal swellability, the membrane 6 should have no or essentially no strongly hydrophilic groups. For the purposes of minimal swelling, however, the membrane 6 may comprise weakly hydrophilic groups (for example polyether groups) or a but small number of more strongly hydrophilic groups.

The use of so-called breathable membranes 6, i.e., of, in particular, water-vapor-pervious but liquid-impervious membranes 6, in particular in the form of thin films/foils makes it possible to achieve surprising improvements for NBC protective clothing, in particular when the adsorbing layer 4 is disposed so to speak behind the membrane 6, i.e., downstream of membrane 6 in the use or worn state.

In a very particular embodiment of the present invention, the membrane 6 can be self-adhesive, in particular heat-tacky, so that the membrane 6 can also serve as adhesive layer to secure the adsorbing layer 4.

Figure 2:
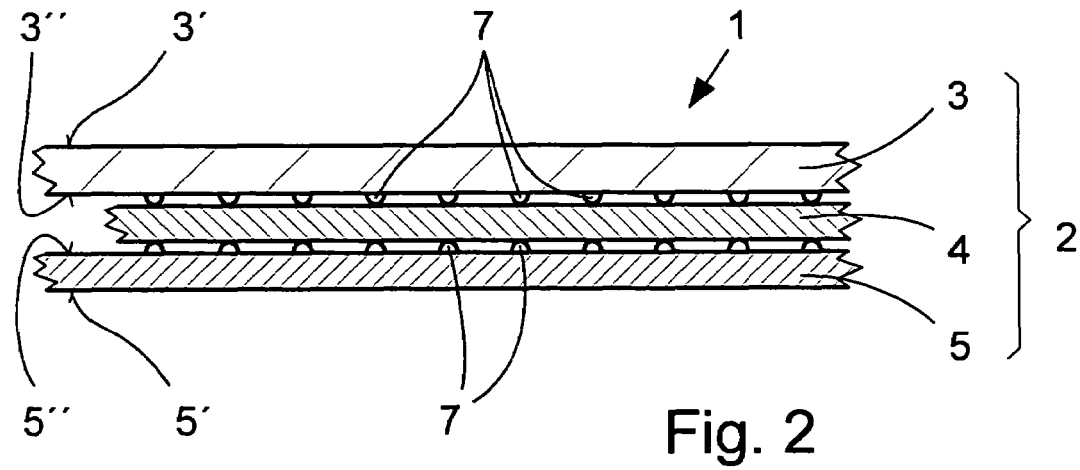
FIG. 2 shows a schematic section through the layered construction of an absorptive filtering material according to another preferred operative example of the invention as per a further embodiment.

FIG. 2 shows a present invention adsorptive filtering material 1 according to a particular refinement of the present invention. The adsorptive filtering material 1 of FIG. 2 comprises two supporting materials/layers 3 and 5 between which is disposed a sheetlike (i.e. flat-shaped) adsorbing layer based on an activated carbon fiber sheetlike (i.e. flat-shaped) structure 4 which a dotwise applied/printed adhesive 7 fixes to the supporting layers 3 and 5. One of the two supporting layers 3, 5 can be a PA-PES batt, while the other supporting layer of the pair can be a PES-cellulose textile sheetlike (i.e. flat-shaped) structure. One or more of the surfaces 3', 3", 5' and/or 5" of the supporting layers 3 and 5 respectively have been modified (for example hydrophobicized or hydrophilicized, oleophobicized or oleophilicized, roughened, made acidic or alkaline, etc.) by plasma treatment in accordance with the particular intended application. Such a material can be used for example in the production of NBC protective clothing.

The individual layers 3, 4, 5 and 6 of the layered construction 2 may each be interbonded. The layered construction 2 then forms a composite/laminate. Alternatively, however, the individual layers 3, 4, 5 and 6 of the layered construction 2 may also be, at least some of them, placed on top of each other without bonding in between. This depends in each case on the intended application for the present invention's adsorptive filtering material 1.

The production of the present invention's adsorptive filtering material 1 as a whole can be effected in a conventional manner. This will be known to those skilled in the arts of producing adsorptive filtering materials, so that no further details concerning this matter need to be discussed in this context.

Altogether, the plasma modification of at least one of the surfaces 3', 3", 5', 5" of at least one of the supporting layers 3 and/or 5 results in a high-performance adsorptive filtering material 1 whose surface properties can be specifically adjusted by the plasma treatment. A hydrophilic modification, for example, provides improved water absorptivity, whereas an oleophobicization ensures improved repellency with regard to organic chemical poisons, in particular warfare agents or noxiants (for example when thickened drops of chemical poisons impinge on the supporting layers 3 and 5). An acidic or alkaline surficial modification, for example, is also a specific way of achieving a neutralization of certain poisons.

Modifying the surfaces of the supporting layers 3 and 5 by plasma treatment thus offers a comprehensive way of specifically adjusting the surface properties of the supporting layers 3 and 5 of the present invention's adsorptive filtering material 1 over a wide range. For example, surface reactivities (for example hydrophilicity or hydrophobicity, oleophobicity or oleophilicity, etc.), surface roughnesses, acidic or alkaline properties and so on can be specifically adjusted/adapted to the particular application requirements. This decisively improves the protective efficiency of the present invention's adsorptive filtering material 1.

In particular, the two sides of the textile composite, i.e., of the adsorptive filtering material according to the present invention, may be subjected to different plasma treatments to achieve different surficial properties on the two sides. For example, one side may be made hydrophilic and the other hydrophobic. The supporting material's textile face, which is to be provided with adhesive or other coatings for example, is hydrophobicized for example. The material can then be used for extensive coatings or dotwise coatings. This ensures that coatings/dots of adhesive will optimally wet the textile face, so that good bonding is achieved coupled with minimal strikethrough of adhesive and dots of coating which remain firmly in place on the material. In this way, the necessary amounts for coatings and adhesive add-on can be economically optimized. Products are textile coatings by means of polyurethanes (so-called direct coatings), the lamination with films and breathable membranes, and also adsorptive filters with activated carbon, where in each case the side to be coated has been modified using plasma treatment. In principle, plasma treatment is advantageous in the production of all kinds of textile composites. Examples of adhesives used are moisture-crosslinking polyurethane reactive adhesives, High Solids® and polyurethane coatings. When the textile substrate to be coated is also worn in textiles as a liner side facing the body, it is sensible from the viewpoint of clothing comfort to make the inside surface hydrophilic in order that good removal of perspiration from the skin may be achieved. It is preferable in this context to use textile substrates composed of polyamide or polyester. Useful plasma-treating methods for the present invention include for example treatments by means of atmospheric plasma or high-vacuum plasma to mention but a few by way of example.

As described above, the adsorptive filtering material of the present invention is useful for producing protective materials of any kind, in particular protective suits, protective gloves, protective shoes and protective covers. The present invention thus also provides for the use of the adsorptive filtering material of the present invention for the aforementioned protective materials and also the protective materials themselves which are produced using the adsorptive filtering material of the present invention, in particular protective suits, protective gloves, protective shoes and protective covers, preferably for NBC deployment.

Further refinements, modifications and variations of the present invention will become apparent to and realizable by the ordinarily skilled after reading the description without their having to depart from the realm of the present invention.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. An adsorptive filtering material, the adsorptive filtering providing protection against chemical poisons, in particular chemical warfare agents and chemical noxiants, and having a layered construction, the layered construction of said adsorptive filtering material comprising:
   at least one supporting layer having two opposite sides; and
   an adsorbing layer associated to the supporting layer and based on a material capable of adsorbing chemical poisons, wherein a surface of at least one of the two sides of the supporting layer is modified by plasma treatment, and wherein said plasma treatment is carried out indirectly at the surface of the supporting layer after preceding application of a polymeric or polymerizable film to said surface to be treated.

2. An adsorptive filtering material, the adsorptive filtering providing protection against chemical poisons, in particular chemical warfare agents and chemical noxiants, and having a layered construction, the layered construction of said adsorptive filtering material comprising:
   at least one supporting layer having two opposite sides;
   an adsorbing layer associated to the supporting layer and based on a material capable of adsorbing chemical poisons, wherein a surface of at least one of the two sides of the supporting layer is modified by plasma treatment;
   wherein the adsorptive filtering material further comprises at least one further, second supporting layer having two opposite sides, the further, second supporting layer being disposed on that side of the adsorbing layer which is opposite the first supporting layer; and
   wherein said plasma treatment has modified the surface reactivity of the surface of at least one of the two sides of the first supporting layer on the one hand and of the surface of at least one of the two sides of the second supporting layer on the other to have respectively contrary properties.

3. An adsorptive filtering material, the adsorptive filtering providing protection against chemical poisons, in particular chemical warfare agents and chemical noxiants, and having a layered construction, the layered construction of said adsorptive filtering material comprising:
   at least one supporting layer having two opposite sides;
   an adsorbing layer associated to the supporting layer and based on a material capable of adsorbing chemical poisons, wherein a surface of at least one of the two sides of the supporting layer is modified by plasma treatment;
   wherein the adsorptive filtering material further comprises at least one further, second supporting layer having two opposite sides, the further, second supporting layer being disposed on that side of the adsorbing layer which is opposite the first supporting layer; and
   wherein at least one of the first or second supporting layers has at least one surface made oleophobic by plasma treatment and wherein at least one of the first or second supporting layers has at least one surface made hydrophilic by plasma treatment.

4. An adsorptive filtering material, the adsorptive filtering providing protection against chemical poisons, in particular chemical warfare agents and chemical noxiants, and having a layered construction, the layered construction of said adsorptive filtering material comprising:
   at least one supporting layer having two opposite sides;
   an adsorbing layer associated to the supporting layer and based on a material capable of adsorbing chemical poisons, wherein a surface of at least one of the two sides of the supporting layer is modified by plasma treatment;
   wherein the adsorptive filtering material further comprises at least one further, second supporting layer having two opposite sides, the further, second supporting layer being disposed on that side of the adsorbing layer which is opposite the first supporting layer; and
   wherein said plasma treatment has made the surface of the outer side of the first supporting layer which faces away from the adsorbing layer oleophobic, while the surface of the outer side of the second supporting layer which faces away from the adsorbing layer has been made hydrophilic.

5. An adsorptive filtering material, the adsorptive filtering providing protection against chemical poisons, in particular chemical warfare agents and chemical noxiants, and having a layered construction, the layered construction of said adsorptive filtering material comprising:
   at least one supporting layer having two opposite sides;
   an adsorbing layer associated to the supporting layer and based on a material capable of adsorbing chemical poisons, wherein a surface of at least one of the two sides of the supporting layer is modified by plasma treatment;

wherein the adsorptive filtering material further comprises at least one further, second supporting layer having two opposite sides, the further, second supporting layer being disposed on that side of the adsorbing layer which is opposite the first supporting layer; and wherein the supporting layer which faces a noxiant source in the use state of the adsorptive filtering material has been made oleophobic by the plasma treatment on its side which faces the noxiant source and wherein the supporting layer which faces away from the noxiant source in the use state of the adsorptive filtering material has been made hydrophilic by the plasma treatment on its side which faces away from the noxiant source.

* * * * *